United States Patent
Hosoda et al.

(10) Patent No.: US 10,836,877 B2
(45) Date of Patent: Nov. 17, 2020

(54) PREPREG, METHOD FOR ITS PRODUCTION AND FIBER-REINFORCED MOLDED PRODUCT

(71) Applicant: AGC Inc., Chiyoda-ku (JP)

(72) Inventors: Tomoya Hosoda, Chiyoda-ku (JP); Takashi Sato, Chiyoda-ku (JP); Masatoshi Abe, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 34 days.

(21) Appl. No.: 15/997,004

(22) Filed: Jun. 4, 2018

(65) Prior Publication Data

US 2018/0282500 A1    Oct. 4, 2018

Related U.S. Application Data

(63) Continuation of application No. PCT/JP2017/000864, filed on Jan. 12, 2017.

(30) Foreign Application Priority Data

Jan. 13, 2016 (JP) ................. 2016-004492

(51) Int. Cl.
| | |
|---|---|
| *C08J 5/24* | (2006.01) |
| *C08J 5/04* | (2006.01) |
| *B32B 25/14* | (2006.01) |
| *B29C 70/02* | (2006.01) |
| *B29C 70/08* | (2006.01) |
| *B29C 70/50* | (2006.01) |
| *C08L 27/18* | (2006.01) |
| *B29K 101/12* | (2006.01) |
| *B29K 105/08* | (2006.01) |

(52) U.S. Cl.
CPC .............. *C08J 5/24* (2013.01); *B29C 70/025* (2013.01); *B29C 70/08* (2013.01); *B29C 70/506* (2013.01); *B32B 25/14* (2013.01); *C08J 5/042* (2013.01); *C08L 27/18* (2013.01); *B29K 2101/12* (2013.01); *B29K 2105/0872* (2013.01); *C08J 2327/18* (2013.01); *C08J 2377/02* (2013.01); *C08L 2205/02* (2013.01)

(58) Field of Classification Search
CPC ..... B29C 70/025; B29C 70/08; B29C 70/506; B29K 2101/12; B29K 2105/0872; C08J 2327/19; C08J 2377/02; C08J 5/042; C08J 5/24; C08L 2205/02; C08L 27/18; C08L 27/12; C08L 27/16; C08F 214/26; C08F 214/262

USPC ........................................ 428/292.1; 525/146
See application file for complete search history.

(56) References Cited

U.S. PATENT DOCUMENTS

| | | | | |
|---|---|---|---|---|
| 5,750,626 | A | * 5/1998 | Shimizu | ................ C08G 59/30 525/133 |
| 2012/0149798 | A1 | 6/2012 | Saito et al. | |
| 2014/0342155 | A1* | 11/2014 | Abe | ..................... C08F 214/26 428/379 |
| 2018/0282499 | A1* | 10/2018 | Hosoda | .................. C08L 79/08 |

FOREIGN PATENT DOCUMENTS

| | | |
|---|---|---|
| CN | 104010783 A | 8/2014 |
| CN | 104144638 A | 11/2014 |
| JP | 04-125111 | 4/1992 |
| JP | 04-163003 | 6/1992 |
| JP | 2008-189867 | 8/2008 |
| JP | 2012-501407 | 1/2012 |
| JP | 2013-531717 | 8/2013 |
| WO | WO 2009/020182 A1 | 2/2009 |
| WO | WO 2011/021670 A1 | 2/2011 |

OTHER PUBLICATIONS

International Search Report dated Apr. 11, 2017 in PCT/JP2017/000864 filed Jan. 12, 2017 (with English Translation).

* cited by examiner

*Primary Examiner* — Camie S Thompson
(74) *Attorney, Agent, or Firm* — Oblon, McClelland, Maier & Neustadt, L.L.P.

(57) ABSTRACT

To provide a prepreg excellent in storage stability and capable of obtaining a fiber-reinforced molded product excellent in impact resistance, chemical resistance and inter-member (interlayer) adhesion and a method for its production as well as a fiber-reinforced molded product excellent in impact resistance, chemical resistance and inter-member (interlayer) adhesion. The prepreg comprises reinforcing fibers and a matrix resin, wherein the matrix resin comprises, as a resin component, only a melt-moldable fluororesin having a melting point of from 100 to 325° C. and having functional groups of at least one type selected from the group consisting of carbonyl group-containing groups, hydroxy groups, epoxy groups and isocyanate groups, or the fluororesin and a thermoplastic resin (but excluding the fluororesin), and in 100 mass % of the total of the fluororesin and the thermoplastic resin, the proportion of the fluororesin is from 70 to 100 mass % and the proportion of the thermoplastic resin is from 0 to 30 mass %.

10 Claims, No Drawings

PREPREG, METHOD FOR ITS PRODUCTION AND FIBER-REINFORCED MOLDED PRODUCT

TECHNICAL FIELD

The present invention relates to a prepreg and a method for its production as well as a fiber-reinforced molded product using the prepreg.

BACKGROUND ART

Fiber-reinforced molded products have been employed in a wide range of applications including transport equipment (vehicles (automobiles, railway vehicles, etc.), aircrafts, etc.), building components, electronic devices, etc. As matrix resins for the fiber-reinforced molded products, cured products of thermosetting resins have been commonly employed.

However, the fiber-reinforced molded products wherein cured products of thermosetting resins are used as the matrix resins, have the following problems.

- Since the cured products of the thermosetting resins are brittle, impact resistance of the fiber-reinforced molded products is insufficient.
- In prepregs being precursors for fiber-reinforced molded products, thermosetting resins before curing tend to be hardened during storage of the prepregs, whereby the useful life of the prepregs is relatively short.

Therefore, a prepreg and a fiber-reinforced molded product have been proposed wherein a thermoplastic resin is employed as the matrix resin (e.g. Patent Documents 1 and 2).

PRIOR ART DOCUMENTS

Patent Documents

Patent Document 1: JP-A-2013-531717
Patent Document 2: JP-A-2012-501407

DISCLOSURE OF INVENTION

Technical Problem

However, the conventional fiber-reinforced molded product using a thermoplastic resin as the matrix resin is insufficient in chemical resistance.

Further, in Patent Document 2, it is disclosed that the fiber-reinforced molded product may contain particles of polytetrafluoroethylene. Polytetrafluoroethylene is, although excellent in chemical resistance, low in affinity to other materials. Therefore, a fiber-reinforced molded product (laminate) formed by using a prepreg containing particles of polytetrafluoroethylene and another member (another prepreg, a metal member, etc.), is insufficient in adhesion between the members (between the layers).

The present invention is to provide a prepreg excellent in storage stability and capable of obtaining a fiber-reinforced molded product excellent in impact resistance, chemical resistance and inter-member (interlayer) adhesion, and a process for its production, as well as a fiber-reinforced molded product excellent in impact resistance, chemical resistance and inter-member (interlayer) adhesion.

Solution to Problem

The present invention has the following embodiments.
<1> A prepreg comprising reinforcing fibers and a matrix resin, wherein the matrix resin comprises, as a resin component, only a melt-moldable fluororesin having a melting point of at least 100° C. and at most 325° C. and having functional groups of at least one type selected from the group consisting of carbonyl group-containing groups, hydroxy groups, epoxy groups and isocyanate groups, or the fluororesin and a thermoplastic resin (but excluding the same one as the fluororesin), and in 100 mass % of the total of the fluororesin and the thermoplastic resin, the proportion of the fluororesin is from 70 to 100 mass % and the proportion of the thermoplastic resin is from 0 to 30 mass %.
<2> The prepreg according to <1>, wherein in 100 mass % of the total of the fluororesin and the thermoplastic resin, the proportion of the fluororesin is from 70 to less than 100 mass %, and the proportion of the thermoplastic resin is from more than 0 to 30 mass %, and the matrix resin has a sea-island structure composed of a sea portion containing the fluororesin and island portions containing the thermoplastic resin, wherein the average diameter of the island portions is from 0.01 to 200 µm.
<3> The prepreg according to <1> or <2>, wherein the melting point of the fluororesin is from 100 to less than 260° C.
<4> A method for producing a prepreg, wherein a powder mixture obtained by mixing a powder (X) made of a resin material (α) containing a melt-moldable fluororesin having a melting point of from 100 to 325° C. and having functional groups of at least one type selected from the group consisting of carbonyl group-containing groups, hydroxy groups, epoxy groups and isocyanate groups, and a powder (Y) made of a resin material (β) containing a thermoplastic resin (but excluding the fluororesin) so that in 100 mass % of the total of the fluororesin and the thermoplastic resin, the proportion of the fluororesin becomes from 70 to less than 100 mass %, and the proportion of the thermoplastic resin becomes from more than 0 to 30 mass %, is melted in the presence of a reinforcing fiber sheet, to let the resin material (α) and the resin material (β) be impregnated into the reinforcing fiber sheet.
<5> The method for producing a prepreg according to <4>, wherein the average particle diameter of the powder (X) is from 0.02 to 200 µm, and the average particle diameter of the powder (Y) is from 0.02 to 200 µm.
<6> A method for producing a prepreg, wherein a powder (Z) made of a resin material (γ) comprising, as a resin component, only a melt-moldable fluororesin having a melting point of from 100 to 325° C. and having functional groups of at least one type selected from the group consisting of carbonyl group-containing groups, hydroxy groups, epoxy groups and isocyanate groups, or the fluororesin and a thermoplastic resin (but excluding the fluororesin), so that in 100 mass % of the total of the fluororesin and the thermoplastic resin, the proportion of the fluororesin is from 70 to 100 mass %, and the proportion of the thermoplastic resin is from 0 to 30 mass %, is melted in the presence of a reinforcing fiber sheet, to let the resin material (γ) be impregnated into the reinforcing fiber sheet.
<7> The method for producing a prepreg according to <6>, wherein the average particle diameter of the powder (Z) is from 0.02 to 200 µm, in 100 mass % of the total of the fluororesin and the thermoplastic resin, the proportion of the fluororesin is from 70 to less than 100 mass %, and the proportion of the thermoplastic resin is from more than 0 to 30 mass %, and the average diameter of island portions containing the thermoplastic resin in the resin material (γ) prior to being impregnated into the reinforcing fiber sheet is from 0.01 to 8 μm and less than the average particle diameter of the powder (Z).

<8> A method for producing a prepreg, wherein a resin film made of a resin material (γ) comprising, as a resin component, only a melt-moldable fluororesin having a melting point of from 100 to 325° C. and having functional groups of at least one type selected from the group consisting of carbonyl group-containing groups, hydroxy groups, epoxy groups and isocyanate groups, or the fluororesin and a thermoplastic resin (but excluding the fluororesin), so that in 100 mass % of the total of the fluororesin and the thermoplastic resin, the proportion of the fluororesin is from 70 to 100 mass %, and the proportion of the thermoplastic resin is from 0 to 30 mass %, is melted in the presence of a reinforcing fiber sheet, to let the resin material (γ) be impregnated into the reinforcing fiber sheet.

<9> The method for producing a prepreg according to <8>, wherein in 100 mass % of the total of the fluororesin and the thermoplastic resin, the proportion of the fluororesin is from 70 to less than 100 mass %, and the proportion of the thermoplastic resin is from more than 0 to 30 mass %, and the average diameter of island portions containing the thermoplastic resin in the resin material (γ) prior to being impregnated into the reinforcing fiber sheet is from 0.01 to 8 μm and less than the thickness of the resin film.

<10> A fiber-reinforced molded product using the prepreg as defined in any one of <1> to <3>.

Advantageous Effects of Invention

According to the prepreg of the present invention, it is possible to obtain a fiber-reinforced molded product excellent in impact resistance, chemical resistance and inter-member (interlayer) adhesion. Further, the prepreg of the present invention is excellent in storage stability. According to the method for producing a prepreg of the present invention, it is possible to produce a prepreg excellent in storage stability and capable of obtaining a fiber-reinforced molded product excellent in impact resistance, chemical resistance and inter-member (interlayer) adhesion. The fiber-reinforced molded product of the present invention is excellent in impact resistance, chemical resistance and inter-member (interlayer) adhesion.

DESCRIPTION OF EMBODIMENTS

The following definitions of terms apply throughout the specification including claims.

The "melting point" is the temperature corresponding to the maximum value of the melting peak as measured by a differential scanning calorimetry (DSC) method.

Being "melt-moldable" means showing a melt flowability.

"Showing a melt flowability" means that a temperature at which the melt flow rate becomes to be from 0.1 to 1,000 g/10 min. is present in a temperature range higher by at least 20° C. than the melting point of the resin under a condition of a load of 49N.

The "melt flow rate" is a melt mass flow rate (MFR) specified in JIS K7210; 1999 (ISO 1133; 1997).

A "unit" means a moiety (polymerized unit) derived from a monomer, which is formed by polymerization of the monomer. A unit may be a unit formed directly by the polymerization reaction, or may be a unit having a part of such a unit converted to another structure by treating the polymer.

The "average diameter of island portions" is one obtained by measuring the areas with respect to five island portions in an electron microscope image of a resin material or a matrix resin and calculating the circle equivalent diameters from the areas, followed by averaging them.

The "average particle diameter of a powder" is a volume-based cumulative 50% diameter (D50) obtainable by a laser diffraction scattering method. That is, the particle size distribution is measured by a laser diffraction scattering method, to obtain a cumulative curve based on the total volume of the population of particles being 100%, whereby it is the particle diameter at the point where the cumulative volume becomes 50% on the cumulative curve.

<Prepreg>

The prepreg of the present invention comprises reinforcing fibers and a matrix resin. Specifically, it is a sheet-form material having a matrix resin impregnated to reinforcing fibers, and it is also referred to as a sheet-form material having reinforcing fibers embedded in a matrix resin. Here, it includes, not only one completely impregnated, but also one so-called semi-preg obtained by letting a matrix resin powder be adhered to the surface of reinforcing fibers and melted to let it be semi-impregnated into the reinforcing fibers.

(Reinforcing Fibers)

As the reinforcing fibers, from the viewpoint of mechanical properties of fiber-reinforced molded products, continuous long fibers with a length of at least 10 mm are preferred. The reinforcing fibers need not be continuous over the entire length in the longitudinal direction or over the entire width in the width direction of the reinforcing fibers and may be divided in the middle.

As the processed form of reinforcing fibers, from the viewpoint of mechanical properties of fiber-reinforced molded products, one processed into a sheet (hereinafter referred to as a reinforcing fiber sheet) is preferred.

The reinforcing fiber sheet may, for example, be a reinforcing fiber bundle composed of a plurality of reinforcing fibers, a cloth made by weaving such reinforcing fiber bundles, a unidirectional reinforcing fiber bundle having a plurality of reinforcing fibers drawn and aligned in one direction, a unidirectional cloth composed of such unidirectional reinforcing fiber bundles, a combination thereof, or one having a plurality of reinforcing fiber bundles laminated.

The reinforcing fibers may be inorganic fibers, metal fibers, organic fibers, etc.

The inorganic fibers may be carbon fibers, graphite fibers, glass fibers, silicon carbide fibers, silicon nitride fibers, alumina fibers, silicon carbide fibers, boron fibers, etc.

The metal fibers may be aluminum fibers, brass fibers, stainless steel fibers, etc.

The organic fibers may be aromatic polyamide fibers, polyamide fibers, polyparaphenylene benzoxazole (PBO) fibers, polyphenylene sulfide fibers, polyester fibers, acrylic fibers, nylon fibers, polyethylene fibers, etc.

The reinforcing fibers may be those having surface treatment applied. As the reinforcing fibers, one type may be used alone, or two or more types may be used in combination. As the reinforcing fibers, carbon fibers are preferred, since they have a small specific gravity, a high strength and a high modulus.

As the carbon fibers, for example, those described in WO2013/129169 may be mentioned, and particularly, those described in paragraphs 0018 to 0026 are preferred. Further, as the production methods for the carbon fibers, those described in paragraphs from 0028 to 0033 may be mentioned.

(Matrix Resin)

The matrix resin comprises, as a resin component, only a fluororesin (A), or the fluororesin (A) and a thermoplastic resin (B) (but excluding the fluororesin (A)). The matrix resin may contain components other than the fluororesin (A) and the thermoplastic resin (B) within a range not to impair the effects of the present invention.

Sea-Island Structure:

In a case where the matrix resin contains a thermoplastic resin (B), the matrix resin preferably has a sea-island structure composed of a sea portion containing the fluororesin (A) and island portions containing the thermoplastic resin (B), from the viewpoint of inter-member (interlayer) adhesion in the fiber-reinforced molded product, and from the viewpoint of the chemical resistance of the fiber-reinforced molded product.

The average diameter of the island portions is preferably at least 0.01 μm and at most 200 μm, and more preferably at least 0.01 μm and at most 100 μm. When the average diameter of the island portions is at least the lower limit value in the above range, the fiber-reinforced molded product will be remarkably excellent in impact resistance. When the average diameter of the island portions is at most the upper limit value in the above range, inter-member (interlayer) adhesion in the fiber-reinforced molded product, and chemical resistance of the fiber-reinforced molded product will be remarkably excellent.

Fluororesin (A):

The fluororesin (A) is a fluororesin having functional groups of at least one type selected from the group consisting of carbonyl group-containing groups, hydroxy groups, epoxy groups and isocyanate groups (hereinafter referred to as functional groups (f)). By having fluorine atoms, chemical resistance of the fiber-reinforced molded product will be excellent. By having adhesive functional groups (f), inter-member (interlayer) adhesion in the fiber-reinforced molded product will be excellent.

The functional groups (f) are preferably present as either one or both of the main chain terminal groups and the main chain pendant groups of the fluororesin (A), from the viewpoint of excellent inter-member (interlayer) adhesion in the fiber-reinforced molded product. The functional groups (f) may be of one type, or may be of two or more types.

The fluororesin (A) preferably has at least carbonyl group-containing groups as functional groups (f), from the viewpoint of inter-member (interlayer) adhesion in the fiber-reinforced molded product.

A carbonyl group-containing group may, for example, be a group having a carbonyl group between carbon atoms of a hydrocarbon group, a carbonate group, a carboxy group, a haloformyl group, an alkoxycarbonyl group, an acid anhydride group, etc.

In the group having a carbonyl group between carbon atoms of a hydrocarbon group, the hydrocarbon group may, for example, be an alkylene group having from 2 to 8 carbon atoms. Here, the number of carbon atoms in the alkylene group is the number of carbon atoms in the state that does not include carbon atoms constituting the carbonyl group. The alkylene group may be linear or may be branched.

A haloformyl group is represented by —C(=O)—X (wherein X is a halogen atom). As the halogen atom in the haloformyl group, a fluorine atom, a chlorine atom, etc. may be mentioned, and a fluorine atom is preferred. That is, as the haloformyl group, a fluoroformyl group (also referred to as a carbonyl fluoride group) is preferred.

In the alkoxycarbonyl group, the alkoxy group may be linear or may be branched, preferably an alkoxy group having from 1 to 8 carbon atoms, and a methoxy group or an ethoxy group is particularly preferred.

The content of the functional groups (f) in the fluororesin (A) is preferably from 10 to 60,000 groups, more preferably from 100 to 50,000 groups, further preferably from 100 to 10,000 groups, particularly preferably from 300 to 5,000 groups, to $1×10^6$ carbon atoms in the fluororesin (A). When the content of the functional groups (f) is at least the lower limit value in the above range, inter-member (interlayer) adhesion in the fiber-reinforced molded product will be remarkably excellent. When the content of the functional groups (f) is at most the upper limit value in the above range, even by lowering the temperature at the time of molding the prepreg, inter-member (interlayer) adhesion in the fiber-reinforced molded product will be excellent.

The content of functional groups (f) may be measured by a method such as a nuclear magnetic resonance (NMR) analysis, an infrared absorption spectrum analysis, etc. For example, using a method such as an infrared absorption spectroscopy as described in JP-A-2007-314720, the proportion (mol %) of units having functional groups (f) in all units constituting the fluororesin (A) is obtained, and from that proportion, the content of the functional groups (f) may be calculated.

The melting point of the fluororesin (A) is at least 100° C. and at most 325° C., preferably at least 100° C. and less than 260° C., more preferably at least 120° C. and at most 220° C. When the melting point of the fluororesin (A) is at least the lower limit value in the above range, heat resistance of the fiber-reinforced molded product will be excellent. When the melting point of the fluororesin (A) is at most the upper limit value in the above range, it will be possible to use a common apparatus at the time of producing a fiber-reinforced molded product, and inter-member (interlayer) adhesion in the fiber-reinforced molded product will be excellent.

In a case where a fluororesin (A) having a relatively low melting point is used, even if the temperature at the time of molding the prepreg is made low, inter-member (interlayer) adhesion in the fiber-reinforced molded product will be excellent. Therefore, in such a case, the melting point of the fluororesin (A) is preferably at least 120° C. and at most 220° C., more preferably at least 120° C. and at most 200° C.

In a case where a fluororesin (A) having a relatively high melting point is used, a fiber-reinforced molded product having high heat resistance will be obtained, such being preferred. Therefore, in such a case, the melting point of the fluororesin (A) is preferably from 260 to 320° C., more preferably from 280 to 320° C.

The melting point of the fluororesin (A) may be adjusted by the types and proportions of the units constituting the fluororesin (A), the molecular weight of the fluororesin (A), etc. For example, as the proportion of the units (u1) to be described later becomes large, the melting point tends to rise.

As the fluororesin (A), a melt-moldable one is used from such a viewpoint that it will be thereby easy to produce a powder, a resin film and a prepreg.

The melt-moldable fluororesin (A) may be a fluororesin prepared by introducing functional groups (f) into a known melt moldable fluororesin (a tetrafluoroethylene/fluoroalkyl vinyl ether copolymer, a tetrafluoroethylene/hexafluoropropylene copolymer, an ethylene/tetrafluoroethylene copolymer, polyvinylidene fluoride, polychlorotrifluoroethylene, an ethylene/chlorotrifluoroethylene copolymer, etc.); a fluoropolymer (A11) to be described later, etc.

As the fluororesin (A), one is used where a temperature at which the melt flow rate becomes to be from 0.1 to 1,000 g/10 min. is present in a temperature range higher by at least 20° C. than the melting point of the fluororesin (A) under a load of 49N. The melt flow rate is preferably from 0.5 to 100 g/10 min., more preferably from 1 to 30 g/10 min., further preferably from 5 to 20 g/10 min. When the melt flow rate is at least the lower limit value in the above range, moldability of the fluororesin (A) will be excellent. When the melt flow rate is at most the upper limit value of the above range, mechanical properties of the fiber-reinforced molded product will be excellent.

As the fluororesins (A), for example, the following ones may be mentioned depending upon the difference in the production method.

Fluororesin (A1): A fluorinated polymer having functional groups (f) derived from at least one member selected from the group consisting of a monomer, a chain transfer agent and a polymerization initiator used in the production of the fluorinated polymer. Hereinafter, the fluororesin (A1) may also be referred to as a fluorinated polymer (A1).

Fluororesin (A2): A fluororesin obtained by introducing functional groups (f) to a fluororesin having no functional group (f) by surface treatment such as corona discharge treatment, plasma treatment, etc.

Fluororesin (A3): A fluororesin obtained by graft-polymerizing a monomer having a functional group (f) to a fluororesin having no functional group (f).

As the fluororesin (A), the fluorinated polymer (A1) is preferred from the following reasons.

In the fluorinated polymer (A1), functional groups (f) are present at either one or both of the main chain terminal groups and the main chain pendant groups of the fluorinated polymer (A1), whereby inter-member (interlayer) adhesion in the fiber-reinforced molded product will be remarkably excellent.

In the fluororesin (A2), the functional groups (f) are unstable because they were formed by surface treatment, and are likely to disappear as time passes.

In a case where functional groups (f) in the fluorinated polymer (A1) are derived from a monomer used in the production of the fluorinated polymer (A1), the fluorinated polymer (A1) may be produced by the following method (i). In such a case, the functional groups (f) are present in units derived from the monomer, which are formed by polymerization of the monomer at the time of the production.

Method (i): A monomer having a functional group (f) is used at the time of producing a fluoropolymer (A1) by polymerization of monomers.

In a case where functional groups (f) in the fluorinated polymer (A1) are derived from a chain transfer agent used in the production of the fluorinated polymer (A1), the fluorinated polymer (A1) may be produced by the following method (ii). In such a case, the functional groups (f) are present as terminal groups in the main chain of the fluorinated polymer (A1).

Method (ii): in the presence of a chain transfer agent having a functional group (f), a fluorinated polymer (A1) is produced by polymerization of monomers.

The chain transfer agent having a functional group (f) may be acetic acid, acetic anhydride, methyl acetate, ethylene glycol, propylene glycol, etc.

In a case where functional groups (f) in the fluorinated polymer (A1) are derived from a polymerization initiator used in the production of the fluorinated polymer (A1), the fluorinated polymer (A1) may be produced by the following method (iii). In such a case, the functional groups (f) are present as terminal groups in the main chain of the fluoropolymer (A1).

Method (iii): in the presence of a polymerization initiator such as a radical polymerization initiator having a functional group (f), a fluorinated polymer (A1) is produced by polymerization of monomers.

As the radical polymerization initiator having a functional group (f), di-n-propyl peroxydicarbonate, diisopropyl peroxydicarbonate, tert-butylperoxy isopropyl carbonate, bis(4-tert-butylcyclohexyl) peroxydicarbonate, di-2-ethylhexyl peroxydicarbonate, etc. may be mentioned.

In a case where functional groups (f) in the fluorinated polymer (A1) are derived from two or more members among a monomer, a chain transfer agent and a polymerization initiator used in the production of the fluorinated polymer (A1), the fluorinated polymer (A1) may be produced by combining two or more among the methods (i) to (iii).

As the fluorinated polymer (A1), from such a viewpoint that it is easy to control the content of functional groups (f), and thus, it is easy to adjust the inter-member (interlayer) adhesion in the fiber-reinforced molded product, preferred is a fluorinated polymer (A1) having functional groups (f) derived from a monomer, produced by the method (i).

The monomer having a functional group (f) may be a monomer having a carboxy group (maleic acid, itaconic acid, citraconic acid, undecylenic acid, etc.); a monomer having an acid anhydride group (itaconic anhydride (hereinafter referred to also as "IAH"), citraconic anhydride (hereinafter referred to also as "CAH"), 5-norbornene-2,3-dicarboxylic anhydride (hereinafter referred to also as "NAH"), maleic anhydride, etc.), a monomer having a hydroxy group and an epoxy group (hydroxybutyl vinyl ether, glycidyl vinyl ether, etc.), etc.

Fluorinated Polymer (A11):

As the fluorinated polymer (A1) having functional groups (f) derived from a monomer, from such a viewpoint that inter-member (interlayer) adhesion in the fiber-reinforced molded product will be remarkably excellent, the following fluorinated polymer (A11) is particularly preferred.

A fluorinated polymer (A11) having units (u1) derived from tetrafluoroethylene (hereinafter referred to also as "TFE") or chlorotrifluoroethylene (hereinafter referred to also as "CTFE"), units (u2) derived from a cyclic hydrocarbon monomer having an acid anhydride group (hereinafter referred to also as an "acid anhydride group-containing cyclic hydrocarbon monomer"), and units (u3) derived from a fluorinated monomer (but excluding TFE and CTFE).

Here, an acid anhydride group which the unit (u2) has, corresponds to a functional group (f).

The acid anhydride group-containing cyclic hydrocarbon monomer to constitute the units (u2) may be IAH, CAH, NAH, maleic anhydride, etc. As the acid anhydride group-containing cyclic hydrocarbon monomer, one type may be used alone, or two or more types may be used in combination.

As the acid anhydride group-containing cyclic hydrocarbon monomer, at least one member selected from the group consisting of IAH, CAH and NAH is preferred. When at least one member selected from the group consisting of IAH, CAH and NAH is used, it is possible to easily produce a fluorinated polymer (A11) having acid anhydride groups without using a special polymerization method (see JP-A-11-193312) which is required in the case of using maleic acid anhydride.

As the acid anhydride group-containing cyclic hydrocarbon monomer, IAH or NAH is preferred from such a viewpoint that inter-member (interlayer) adhesion in the fiber-reinforced molded product will be remarkably excellent.

The fluorinated monomer to constitute units (u3) is preferably a fluorinated compound having one polymerizable carbon-carbon double bond, and, for example, a fluoroolefin (vinyl fluoride, vinylidene fluoride, trifluoroethylene, hexafluoropropylene (hereinafter referred to also as "HFP"), hexafluoroisobutylene, etc., but excluding TFE), $CF_2=CFOR^{f1}$ (wherein $Rf^1$ is a $C_{1-3}$ perfluoroalkyl group which may contain an oxygen atom between carbon atoms) (hereinafter referred to also as "PAVE"), $CF_2=CFOR^{f2}SO_2X^1$ (wherein $Rf^2$ is a $C_{1-10}$ perfluoroalkylene group which may have an oxygen atom between carbon atoms, and $X^1$ is a halogen atom or a hydroxy group), $CF_2=CFOR^{f3}CO_2X^2$ (wherein $Rf^3$ is a $C_{1-3}$ perfluoroalkylene group which may contain an oxygen atom between carbon atoms, $X^2$ is a hydrogen atom or a $C_{1-3}$ alkyl group), $CF_2=CF(CF_2)_pOCF=CF_2$ (wherein p is 1 or 2.), $CH_2=CX^3(CF_2)_qX^4$ (wherein $X_3$ is a hydrogen atom or a fluorine atom, q is an integer of from 2 to 10, and $X^4$ is a hydrogen atom or a fluorine atom) (hereinafter referred to also as "FAE"), a fluorinated monomer having a ring structure (perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.), etc., may be mentioned.

As the fluorinated monomer, from such a viewpoint that the moldability of the fluoropolymer (A11), the flex resistance, etc. of the fiber-reinforced molded product will be excellent, at least one member selected from the group consisting of HFP, PAVE and FAE is preferred, and either one or both of FAE and HFP are more preferred.

PAVE may be $CF_2=CF_2=CFOCF_2CF_3$, $CF_2=CFOCF_2CF_2CF_3$, $CF_2=CFOCF_2CF_2CF_2CF_3$, $CF_2=CFO(CF_2)_6F$ etc., and $CF_2=CFOCF_2CF_2CF_3$ (hereinafter referred to also as "PPVE") is preferred.

FAE may be $CH_2=CF(CF_2F$, $CH_2=CF(CF_2)_3F$, $CH_2=CF(CF_2)_4F$, $CH_2=CF(CF_2)_5F$, $CH_2=CF(CF_2)_6F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_6H$, $CH_2=CH(CF_2)_2F$, $CH_2=CH(CF_2)_3F$, $CH_2=CH(CF_2F$, $CH_2=CH(CF_2)_5F$, $CH_2=CH(CF_2F$, $CH_2=CH(CF_2)_2H$, $CH_2=CH(CF_2)_3H$, $CH_2=CH(CF_2H$, $CH_2=CH(CF_2)_5H$, $CH_2=CH(CF_2)_6H$, etc.

As FAE, preferred is $CH_2=CH(CF_2)_{q1}X^4$ (wherein q1 is from 2 to 6, preferably from 2 to 4), more preferred is $CH_2=CH(CF_2)_2F$, $CH_2=CH(CF_2)_3F$, $CH_2=CH(CF_2F$, $CH_2=CF(CF_2)_3H$ or $CH_2=CF(CF_2)_4H$, and particularly preferred is $CH_2=CH(CF_2)_4F$ or $CH_2=CH(CF_2)_2F$.

Preferred proportions of the respective units in the fluorinated polymer (A11) are as follows.

The proportion of units (u1) is preferably from 90 to 99.89 mol %, more preferably from 95 to 99.47 mol %, further preferably from 96 to 98.95 mol %, to the total of units (u1), units (u2) and units (u3).

The proportion of units (u2) is preferably from 0.01 to 3 mol %, more preferably from 0.03 to 2 mol %, further preferably from 0.05 to 1 mol %, to the total of units (u1), units (u2) and units (u3).

The proportion of units (u3) is preferably from 0.1 to 9.99 mol %, more preferably from 0.5 to 9.97 mol %, further preferably from 1 to 9.95 mol %, to total of units (u1), units (u2) and units (u3).

The fluorinated polymer (A11) may have, in addition to the units (u1) to (u3), units (u4) derived from a monomer having no fluorine (but excluding an acid anhydride group-containing cyclic hydrocarbon monomer).

As the monomer having no fluorine, preferred is a compound having one polymerizable carbon-carbon double bond and no fluorine, and, for example, an olefin (ethylene (hereinafter referred to also as "E"), propylene, 1-butene, etc.), a vinyl ester (vinyl acetate, etc.), etc. may be mentioned. As the monomer having no fluorine, one type may be used alone, or two or more types may be used in combination.

As the monomer having no fluorine, from such a viewpoint that mechanical properties, etc. of the fiber-reinforced molded product will be excellent, preferred is ethylene, propylene or 1-butene, and particularly preferred is ethylene.

In a case where the units (u4) are derived from E, preferred proportions of the respective units are as follows.

The proportion of units (u1) is preferably from 25 to 80 mol %, more preferably from 40 to 65 mol %, further preferably from 45 to 63 mol %, to 100 mol % of the total of units (u1), units (u2), units (u3) and units (u4).

The proportion of units (u2) is preferably from 0.01 to 5 mol %, more preferably from 0.03 to 3 mol %, further preferably from 0.05 to 1 mol %, to 100 mol % of the total of units (u1), units (u2), units (u3) and units (u4).

The proportion of units (u3) is preferably from 0.2 to 20 mol %, more preferably from 0.5 to 15 mol %, further preferably from 1 to 12 mol %, to 100 mol % of the total of units (u1), units (u2), units (u3) and units (u4).

The proportion of units (u4) is preferably from 20 to 75 mol %, more preferably from 35 to 50 mol %, further preferably from 37 to 55 mol %, to 100 mol % of the total of units (u1), units (u2), units (u3) and units (u4).

When the proportions of the respective units are within the above ranges, the flame retardance, chemical resistance, etc. of the fiber-reinforced molded product will be remarkably excellent.

When the proportion of the units (u2) is within the above range, the amount of acid anhydride groups in the fluorinated polymer (A11) becomes proper, and inter-member (interlayer) adhesion in the fiber-reinforced molded product will be remarkably excellent.

When the proportion of the units (u3) is within the above range, the moldability of the fluorinated polymer (A11) and the flexing resistance, etc. of the fiber-reinforced molded product will be remarkably excellent.

The proportions of the respective units may be calculated by the melt NMR analysis, the fluorine content analysis, the infrared absorption spectrum analysis, etc. of the fluorinated polymer (A11).

In the fluorinated polymer (A11), there may be a case where part of the acid anhydride groups in the units (u2) is hydrolyzed, and as a result, units derived from a dicarboxylic acid (itaconic acid, citraconic acid, 5-norbornene-2,3-dicarboxylic acid, maleic acid, etc.) corresponding to the anhydride group-containing cyclic hydrocarbon monomer may be contained. In a case where units derived from such a dicarboxylic acid are contained, the proportion of such units shall be included in the proportion of units (u2).

Preferred specific examples of the fluorinated polymer (A11) may be a TFE/NAH/PPVE copolymer, a TFE/IAH/PPVE copolymer, a TFE/CAH/PPVE copolymer, a TFE/IAH/HFP copolymer, a TFE/CAH/HFP copolymer, a TFE/IAH/$CH_2=CH(CF_2)_4F$/E copolymer, a TFE/CAH/$CH_2=CH(CF_2)_4F$/E copolymer, a TFE/IAH/$CH_2=CH(CF_2)_2F$/E copolymer, a TFE/CAH/$CH_2=CH(CF_2)_2F$/E copolymer, a TFE/IAH/HFP/$CH_2=CH(CF_2)_4F$/E copolymer, etc.

Method for Producing Fluororesin (A):

The fluororesin (A) may be produced by a conventional method. In a case where a fluororesin (A) is produced by polymerization of monomers, as the polymerization method, a polymerization method using a radical polymerization initiator is preferred.

As the polymerization method, a bulk polymerization method, a solution polymerization method using an organic solvent (a fluorinated hydrocarbon, a chlorinated hydrocarbon, a fluorinated chlorinated hydrocarbon, an alcohol, a hydrocarbon, etc.), a suspension polymerization method using an aqueous medium and, as the case requires, a suitable organic solvent, or an emulsion polymerization method using an aqueous medium and an emulsifier, may be mentioned, and a solution polymerization method is preferred.

Thermoplastic Resin (B):

The thermoplastic resin (B) may be a crystalline resin, an amorphous resin, a thermoplastic elastomer, etc. (but excluding the fluororesin (A)).

The crystalline resin may be a polyester resin (polyethylene terephthalate, polybutylene terephthalate, polytrimethylene terephthalate, polyethylene naphthalate, liquid crystal polyester, etc.), a polyolefin resin (polyethylene, polypropylene, polybutylene, acid-modified polyethylene, acid-modified polypropylene, acid-modified polybutylene, etc.), polyoxymethylene, polyamide, a polyarylene sulfide resin (polyphenylene sulfide, etc.), polyketone, polyether ketone, polyether ether ketone, polyether ketone ketone, polyether nitrile, a fluororesin (polytetrafluoroethylene, etc.) other than the fluororesin (A), a liquid crystal polymer, etc.

The amorphous resin may be a styrene resin (polystyrene, an acrylonitrile-styrene resin, an acrylonitrile butadiene styrene resin, etc.), polycarbonate, polymethyl methacrylate, polyvinyl chloride, unmodified or modified polyphenylene ether, thermoplastic polyimide, polyamideimide, polyetherimide, polysulfone, polyether sulfone, polyarylate, etc.

The thermoplastic elastomer may be a polystyrene elastomer, a polyolefin elastomer, a polyurethane elastomer, a polyester elastomer, a polyamide elastomer, a polybutadiene elastomer, a polyisoprene elastomer, a fluorinated elastomer (but excluding the fluororesin (A)), an acrylonitrile elastomer, etc.

Others may be a phenolic resin, a phenoxy resin, etc.

As the thermoplastic resin (B), from the viewpoint of improving the heat resistance of the prepreg, preferred is a polyamide, a polyarylene sulfide resin (polyphenylene sulfide, etc.), polyketone, polyether ketone, polyether ether ketone, polyether ketone ketone, polyether nitrile, modified polyphenylene ether, thermoplastic polyimide, polyamideimide, polyetherimide, polysulfone, polyether sulfone, polyarylate, etc.

Other Components:

Other components contained in the matrix resin may be an inorganic filler, an organic filler, an organic pigment, a metal soap, a surfactant, an ultraviolet absorber, a lubricant, a silane coupling agent, an organic compound (e.g. an organic monomer, an organic oligomer having a polymerization degree of at most 50, etc.), etc., and an inorganic filler is preferred.

The proportions of the Respective Components:

In 100 mol % of the total of the fluororesin (A) and the thermoplastic resin (B), the proportion of the fluororesin (A) is from 70 to 100 mass %, preferably from 70 to less than 100 mass %, further preferably from 80 to less than 100 mass %. When the proportion of the fluororesin (A) is at least the lower limit value in the above range, inter-member (interlayer) adhesion in the fiber-reinforced molded product, and chemical resistance of the fiber-reinforced molded product will be excellent. When the proportion of the fluororesin (A) is less than 100 mass %, it is possible to reduce the expensive fluororesin (A), whereby the costs of the prepreg and the fiber-reinforced molded product will be lowered.

In 100 mol % of the total of the fluororesin (A) and the thermoplastic resin (B), the proportion of the thermoplastic resin (B) is from 0 to 30 mass %, preferably from more than 0 to 30 mass %, more preferably from more than 0 to 20 mass %. When the proportion of the thermoplastic resin (B) is more than 0 mass %, it is possible to reduce the expensive fluororesin (A), whereby the costs of the prepreg and the fiber-reinforced molded product will be lowered. When the proportion of the thermoplastic resin (B) is at most the upper limit value in the above range, the effects exhibited by the fluororesin (A) will not be impaired.

In 100 mass % of the matrix resin, the total proportion of the fluororesin (A) and the thermoplastic resin (B) is preferably from 80 to 100 mass %, more preferably from 85 to 100 mass %, further preferably from 90 to 100 mass %. When the total proportion of the fluororesin (A) and the thermoplastic resin (B) is within the above range, the effects of the present invention will not be impaired.

In a case where the matrix resin contains other components, in 100 mass % of the matrix resin, the total proportion of other components is preferably from more than 0 to 20 mass %, more preferably from more than 0 to 15 mass %, further preferably from more than 0 to 10 mass %. It is also preferred that other components are not contained. When the total proportion of other components is within the above range, the effects of the present invention will be less likely to be impaired.

In the prepreg of the present invention as described above, the matrix resin contains, as the resin component, only a fluororesin (A) having a melting point of at most 325° C. and having adhesive functional groups (f), or such a fluororesin (A) and a thermoplastic resin (B), so that in 100 mass % of the total of the fluororesin (A) and the thermoplastic resin (B), the proportion of the fluororesin (A) is from 1 to less than 70 mass % and the proportion of the thermoplastic resin (B) is from more than 30 to 99 mass %, whereby it is possible to obtain a fiber-reinforced molded product excellent in chemical resistance and inter-member (interlayer) adhesion.

Further, the prepreg of the invention as described above, is a thermoplastic prepreg comprising, as the matrix resin, a melt-moldable fluororesin (A) and, as the case requires, a thermoplastic resin (B), whereby, as compared with a thermosetting prepreg, it is possible to obtain a fiber-reinforced molded product excellent in impact resistance, and it is excellent in storage stability.

<Method for Producing Prepreg>

The prepreg of the present invention may be prepared, for example, by impregnating at least the fluororesin (A) into a reinforcing fiber sheet.

As embodiments of the method for producing a prepreg of the present invention, for example, the following three embodiments may be mentioned.

Method (I): A method wherein a powder mixture obtained by mixing a powder (X) made of a resin material ($\alpha$) containing a fluororesin (A) and a powder (Y) made of a resin material ($\beta$) containing a thermoplastic resin (B) in a specific ratio, is melted in the presence of a reinforcing fiber sheet to let the resin material ($\alpha$) and the resin material ($\beta$) be impregnated into the reinforcing fiber sheet.

Method (II): A method wherein a powder (Z) made of a resin material (γ) comprising a fluororesin (A) and, as the case requires, a thermoplastic resin (B) in a specific ratio, is melted in the presence of a reinforcing fiber sheet, to let the resin material (γ) be impregnated into the reinforcing fiber sheet.

Method (III): A method wherein a resin film made of a resin material (γ) comprising a fluororesin (A) and, as the case requires, a thermoplastic resin (B) in a specific ratio, is melted in the presence of a reinforcing fiber sheet, to let the resin material (γ) be impregnated into the reinforcing fiber sheet.

(Method (I))

As a specific example of the method (I), a method may, for example, be mentioned wherein a stacked product composed of n-layers (where n is an integer of at least 1) of the reinforcing fiber sheet and (n+1)-layers of the powder mixture layer, having the reinforcing fiber sheet and the powder mixture layer alternately stacked, is hot-pressed by a hot pressing machine, let the powder mixture be melted, and to let the resin material (α) and the resin material (β) be impregnated into the reinforcing fiber sheet.

The temperature at the time of the hot pressing is at least the melting point of the fluororesin (A) and at least the melting point of the thermoplastic resin (B), and it is preferably at least the melting point +5° C. and at most the melting point +100° C. of whichever higher between the melting point of the fluororesin (A) and the melting point of the thermoplastic resin (B).

The pressure at the time of the hot pressing is preferably at least 0.1 MPa and at most 50 MPa, more preferably at least 0.5 MPa and at most 30 MPa.

The time for the hot press is preferably at least 3 seconds and at most 180 minutes, more preferably at least 5 seconds and at most 60 minutes.

Powder mixture:

The powder mixture is a mixture of the powder (X) and the powder (Y). The powder mixture may contain other powders other than the powder (X) and the powder (Y) within a range not to impair the effects of the present invention.

The powder mixture is prepared by mixing the powder (X) and the powder (Y) so that the proportion of the fluororesin (A) and the proportion of the thermoplastic resin (B) would be the preferred proportions in the above-mentioned matrix resin.

Powder (X):

The powder (X) is made of a resin material (α) containing a fluororesin (A). The resin material (α) may contain other components other than the fluororesin (A) within a range not to impair the effects of the present invention.

In 100 mass % of the resin material (a), the proportion of the fluororesin (A) is preferably from 80 to 100 mass %, more preferably from 85 to 100 mass %, further preferably from 90 to 100 mass %. When the proportion of the fluororesin (A) is within the above range, the effects of the present invention will be less likely to be impaired.

In a case where the resin material (α) contains other components, in 100 mass % of the resin material (α), the total proportion of other components is preferably from more than 0 to 20 mass %, more preferably from more than 0 to 15 mass %, further preferably from more than 0 to 10 mass %. It is also preferred that the resin material (α) does not contain other components. When the total proportion of other components is within the above range, the effects of the present invention will be less likely to be impaired.

The average particle diameter of the powder (X) is preferably from 0.02 to 200 μm, more preferably from 1 to 100 μm. When the average particle diameter is at least the lower limit value in the above range, work handling efficiency of the powder will be excellent. When the average particle diameter is at most the upper limit value in the above range, it will be easy to let the resin material (a) be impregnated into the reinforcing fiber sheet.

The powder (X) may be produced, for example, by the following procedure.

The fluororesin (A) and, as the case requires, other components are melt-kneaded. A melt of the resin material (α) is extruded in the form of strands. The strands are cut and pelletized by the pelletizer. The pellets are mechanically pulverized. The pulverized product is classified to obtain a powder (X).

The apparatus capable of mechanically pulverizing pellets may be a hammer mill, a pin mill, a disk mill, a rotary mill, a jet mill, a fluidized bed air jet mill, a jaw crusher, a gyratory crusher, a cage mill, a pan crusher, a ball mill, a pebble mill, a rod mill, a tube mill, a disk attrition mill, an attritor, a disk refiner, etc.

Pulverization of pellets is preferably carried out by cooling the pellets to a temperature of at most −40° C., from such a viewpoint that it will be easy to reduce the average particle size of the pulverized product. The cooling temperature is more preferably at most −100° C., further preferably at most −160° C. As the cooling method, a method using dry ice or liquid nitrogen may be mentioned.

Powder (Y):

The powder (Y) is made of a resin material (β) containing the thermoplastic resin (B). The resin material (β) may contain components other than the thermoplastic resin (B) within a range not to impair the effects of the present invention.

In 100 mass % of the resin material (β), the proportion of the thermoplastic resin (B) is preferably from 80 to 100 mass %, more preferably from 85 to 100 mass %, further preferably from 90 to 100 mass %. When the proportion is within the above range, the effects of the present invention will be less likely to be impaired.

In a case where the resin material (β) contains other components, in 100 mass % of the resin material (β), the total proportion of other components is preferably from more than 0 to 20 mass %, more preferably from more than 0 to 15 mass %, further preferably from more than 0 to 10 mass %. It is also preferred that the resin material (β) does not contain other components. When the total proportion of other components is within the above range, the effects of the present invention will be less likely to be impaired.

The average particle diameter of the powder (Y) is preferably from 0.02 to 200 μm, more preferably from 1 to 100 μm. When the average particle diameter is at least the lower limit value in the above range, work handling efficiency of the powder will be excellent. When the average particle diameter is at most the upper limit value in the above range, it will be easy to let the resin material (β) be impregnated into the reinforcing fiber sheet. Further, when the average particle diameter is within the above range, it is possible to bring the average diameter of island portions in the matrix resin to be within the above-mentioned preferred range.

The powder (Y) may be produced, for example, by the same procedure as the above mentioned procedure for producing the powder (X).

(Method (II))

As a specific example of the method (II), a method may, for example, be mentioned wherein a stacked product composed of n-layers (where n is an integer of at least 1) of the reinforcing fiber sheet and (n+1)-layers of the powder (Z) layer, having the reinforcing fiber sheet and the powder (Z) layer alternately stacked, is hot-pressed by a hot pressing machine to let the powder (Z) be melted and to let the resin material (γ) be impregnated into the reinforcing fiber sheet.

The temperature, pressure and time for the hot pressing are the same as in the method (I).

Powder (Z):

The powder (Z) is made of a resin material (γ) comprising a fluororesin (A) and, as the case requires, the thermoplastic resin (B). The resin material (γ) may contain components other than the fluororesin (A) and the thermoplastic resin (B) within a range not to impair the effects of the present invention.

In 100 mass % of the total of the fluororesin (A) and the thermoplastic resin (B) in the resin material (γ), the ranges of the proportion of the fluororesin (A) and the proportion of the thermoplastic resin (B), are the same as the above-mentioned specific ranges in the matrix resin.

In 100 mass % of the resin material (γ), the ranges of the proportion of the fluororesin (A), the proportion of the thermoplastic resin (B) and the total range of other components, are the same as the above-mentioned specific ranges in the matrix resin.

The average diameter of island portions containing the thermoplastic resin (B) in the resin material (γ) prior to being impregnated into the reinforcing fiber sheet is preferably from 0.01 to 8 μm and less than the average particle diameter of the powder (Z), more preferably from 0.01 to 5 μm and less than the average particle diameter of the powder (Z). When the average diameter of island portions is within the above range, it is possible to bring the average diameter of the island portions of the matrix resin to be within the above-mentioned preferred range.

The average particle diameter of the powder (Z) is preferably from 0.02 to 200 μm, more preferably from 1 to 100 μm. When the average particle diameter is at least the lower limit value in the above range, work handling efficiency of the powder will be excellent. When the average particle diameter is at most the upper limit value in the above range, it will be easy to let the resin material (γ) be impregnated in the reinforcing fiber sheet.

The powder (Z) may be produced, for example, by the same procedure as the above-mentioned procedure for producing the powder (X).

(Method (III))

As a specific example of the method (III), a method may, for example, be mentioned wherein a stacked product composed of n-layers (where n is an integer of at least 1) of the reinforcing fiber sheet and (n+1)-layers of the resin film, having the reinforcing fiber sheet and the resin film alternately stacked, is hot-pressed by a hot pressing machine, to let the resin film be melted, and to let the resin material (γ) be impregnated in the reinforcing fiber sheet. The temperature, pressure and time for the hot pressing are the same as in the method (I).

Resin Film:

The resin film is made of a resin material (γ) comprising the fluororesin (A) and, as the case requires, the thermoplastic resin (B).

As the resin material (γ), the same one as the resin material (γ) in the powder (Z) may be mentioned, and a preferred form may also be the same. Further, the average diameter of island portions containing the thermoplastic resin (B) in the resin material (γ) prior to being impregnated into the reinforcing fiber sheet, is preferably less than the thickness of the resin film.

The resin film may be produced, for example, by melt-kneading the fluororesin (A), optionally the thermoplastic resin (B) and optionally other components, and extruding a melt of the resin material (γ) in a film form from a T-die.

<Fiber-Reinforced Molded Product>

The fiber-reinforced molded product of the present invention is one formed by using the prepreg of the present invention.

The fiber-reinforced molded product of the present invention may be one formed by using only the prepreg of the present invention; may be a laminate formed by using the prepreg of the present invention and another prepreg other than the prepreg of the present invention; or may be a laminate formed by using the prepreg of the present invention, as the case requires, another prepreg other than the prepreg of the present invention and another member other than the prepregs.

Another prepreg may, for example, be a prepreg wherein the matrix resin contains a thermoplastic resin (B) and no fluororesin (A).

Another member other than the prepregs may, for example, be a metal member; a resin film containing a thermoplastic resin (B); a resin film containing a fluororesin (A), etc.

The metal member may be a metal foil, various metal parts, etc. As the metal, iron, stainless steel, aluminum, copper, brass, nickel, zinc, etc. may be mentioned. The shape of the metal member is not particularly limited, and may be suitably selected according to the fiber-reinforced molded product to be obtained.

(Method for Producing Fiber-Reinforced Molded Product)

The fiber-reinforced molded product of the present invention may be obtained, for example, by molding, while heating, only one prepreg of the present invention, a stacked product having at least two prepregs of the present invention stacked, or a stacked product having at least one prepreg of the present invention, another prepreg and a member other than the prepregs stacked.

As the molding method, a press molding method using a mold, etc. may be mentioned.

(Applications)

As applications of the fiber-reinforced molded product, the following ones may be mentioned.

Housings for electrical and electronic equipment (personal computers, displays, OA equipment, mobile phones, personal digital assistants, facsimiles, compact discs, portable MD, portable radio cassettes, PDA (portable information terminals such as electronic organizers), video cameras, digital still cameras, optical device, audio, air-conditioning, lighting, entertainment goods, toys goods, other household appliances, etc.), inner members (trays, chassis, etc.), cases for inner members, mechanical parts, etc. Building materials (panels), etc.

Automobile, motorcycle related parts, members and outer plates: motor parts, alternator terminals, alternator connectors, IC regulators, potentiometer for light deer base, suspension parts, various valves (exhaust gas valves, etc.), fuel-related, exhaust system or intake system various pipes, air intake nozzle snorkels, intake manifolds, various arms, various frames, various hinges, various bearings, fuel pumps, gasoline tanks, CNG tanks, engine cooling water joints, carburetor main body, carburetor spacers, exhaust gas sensors, coolant sensors, oil temperature sensors, brake pad wear sensors, throttle position sensors, crankshaft position sensors, air flow meters, brake pad wear sensors, air conditioning thermostat base, heating warm air flow control valves, brush holders for radiator motors, water pump impellers, turbine vanes, wiper motor-related parts, distributors, starter switches, starter relays, transmission wire harnesses, window washer nozzles, air conditioner panel switch boards, coils for fuel-related magnetic valves, fuse connectors, battery trays, AT brackets, head lamp supports, pedal housings, steering wheels, door beams, protectors, chassis, frames, arm rests, horn terminals, step motor rotors, lamp sockets, lamp reflectors, lamp housings, brake pistons, noise shield, radiator supports, spare tire covers, seat shells, solenoid bobbins, engine oil filters, ignition device cases, under covers, scuff plates, pillar trim, propeller shafts, wheels, fenders, fascia, bumpers, bumper beams, hoods, aero parts, platforms, cowl louvers, roofs, instrument panels, spoilers, various modules, etc.

Aircraft-related parts, members and outer plates: landing gear pods, winglets, spoilers, edges, ladders, elevators, failing, ribs, etc. Other: blades of wind turbines, etc. The fiber-reinforced molded product is preferably used particularly for aircraft components, windmill blades, automobile outer plates, and housings, trays, chassis, etc. of electronic devices.

EXAMPLES

In the following, the present invention will be specifically described with reference to Examples, but the invention should not be construed as being limited thereto. Here, Ex. 1, 3 and 4 are Examples of the present invention, and Ex. 2 is a Comparative Example.

(Content of Functional Groups (F))

By the following infrared absorption spectrum analysis, the proportion of units derived from IAH having a functional group (f) in the fluororesin (A) was obtained.

The fluororesin (A) was press-molded to obtain a film of 200 μm. In the infrared absorption spectrum, the absorption peak of units derived from IAH in the fluororesin (A) appears at 1,778 cm$^{-1}$. By measuring the absorbance of the absorption peak, and by using the molar extinction coefficient of 20,810 mol$^{-1}$·l·cm$^{-1}$ of IAH, the proportion (mol %) of units derived from IAH was obtained.

When the above proportion is a (mol %), the number of functional groups (f) (acid anhydride groups) to $1\times10^6$ carbon atoms in the main chain is calculated to be [$a\times10^6$/100] groups.

(Melting Point)

Using a differential scanning calorimeter (DSC apparatus, manufactured by Seiko Instruments Inc.), the polymer was heated at a rate of 10/min., whereby the melting peak was recorded, and temperature (° C.) corresponding to the maximum value was taken as the melting point.

(Melt Flow Rate) Using a melt indexer (manufactured by Techno Seven Co.), the mass (g) of the polymer flowing out in 10 minutes under conditions of 297° C. and a load of 49N from a nozzle having a diameter of 2 mm and a length of 8 mm, was measured.

(Izod Impact Strength)

Using a contour machine (manufactured by Amada Machine Tools Co., Ltd., V-400), a laminate (fiber-reinforced molded product) was cut to obtain a sample having a height: 63 mm, a width: 13 mm and a thickness: 2.8 mm. A notch was imparted at a height of 32 mm of the sample, to obtain a test specimen.

With respect to the test specimen, using an Izod testing apparatus (manufactured by Toyo Seiki Seisaku-sho, Ltd.), the Izod impact strength was measured under conditions of hammer capacity: 2.75 J, hammer weight: 13.97N, distance from the axial center to the center of gravity: 10.54 cm, and distance from the axial center to the hitting point: 33.5 cm.

(Adhesion)

The adhesion between the respective layers of the laminate (fiber reinforced molded product) was evaluated by the following standards.

◯ (good): The respective layers of the fiber-reinforced molded product cannot be peeled off.

x (bad): The respective layers of the fiber-reinforced molded product can be easily peeled off.

(Fluororesins (A))

Fluororesin (A-1): A fluororesin having functional groups (f) (manufactured by Asahi Glass Company, Limited, the type of functional groups (f): carbonyl group-containing groups, the content of functional groups (f): 3,000 groups to $1\times10^6$ carbon atoms in the main chain of the fluororesin (A-1), the melting point: 245° C., the melt flow rate (297° C., load 49N): 22 g/10 min.). The resin was prepared in the same manner as in Example 1 of WO2015/182702, and the molar ratio of TFE/IAH/CH$_2$=CH(CF$_2$)$_2$F/E was 58.5/0.1/2.4/39.

Fluororesin (A'-2): An ethylene/tetrafluoroethylene copolymer not having functional groups (f) (manufactured by Asahi Glass Company, Limited, Fluon (registered trademark) LM-ETFE LM-730AP, the melting point: 225° C., the melt flow rate (297° C., load 49N): 24 g/10 min.).

Fluororesin (A'-3): An ethylene/tetrafluoroethylene copolymer not having functional groups (f) (manufactured by Asahi Glass Company, Limited, Fluon (registered trademark) LM-ETFE LM-720AP, the melting point: 226° C., the melt flow rate (297° C., load 49N): 17.2 g/10 min.).

(Thermoplastic Resin (B))

Thermoplastic resin (B-1): Polyamide 6 (manufactured by Ube Industries, Ltd., UBE Nylon 1024B).

(Ex.1)

With respect to the fluororesin (A-1), using a single-screw extruder (manufactured by Tanabe Plastics Machinery Co., Ltd., VS-30) and a T die with a width of 150 mm, a fluororesin film having a thickness of 100 μm was prepared at a set resin temperature: 280° C. and a line speed: 0.5 m/min.

A carbon cloth (manufactured by Sunlight Inc., plain weave CF3000, thickness: 0.25 mm) and the fluororesin film were cut in a size of 10 cm×10 cm. The fluororesin film and the carbon cloth were alternately stacked to obtain a stacked product composed of one layer of the fluororesin film and two layers of the carbon cloth. The stacked product was press-molded by using a melt heat pressing machine (manufactured by Tester Sangyo Co., Ltd.) under conditions of temperature: 280° C., preheating: 10 minutes, pressure: 10 MPa (absolute pressure, same applies hereinafter), pressing time: 3 minutes, to obtain a prepreg (a-1).

With respect to the thermoplastic resin (B-1), using a single-screw extruder (manufactured by Tanabe Plastics Machinery Co., Ltd., VS-30) and a T-die with a width of 150 mm, a thermoplastic resin film having a thickness of 100 μm was prepared at a set resin temperature: 260° C. and a line speed: 0.5 m/min.

A carbon cloth (manufactured by Sunlight Inc., plain weave CF3000) and the thermoplastic resin film were cut in a size of 10 cm×10 cm. The thermoplastic resin film and the carbon cloth were alternately stacked to obtain a stacked product composed of one layer of the thermoplastic resin film and two layers of the carbon cloth.

The stacked product was press-molded by using a melt heat pressing machine (manufactured by Tester Sangyo Co., Ltd.) under conditions of temperature: 240° C., preheating: 10 minutes, pressure: 10 MPa, pressing time: three minutes, to obtain a prepreg (b-1).

By stacking in the order of prepreg (a-1)/prepreg (b-1)/prepreg (a-1), a stacked product was obtained. The stacked product was press-molded by using a melt heat pressing machine (manufactured by Tester Sangyo Co., Ltd.) under conditions of temperature: 280° C., preheating: 10 minutes, pressure: 10 MPa, pressing time: three minutes, to obtain a laminate (fiber-reinforced molding product). The Izod impact strength and adhesion of the laminate are shown in Table 1.

(Ex. 2)

A prepreg (a'-2) was obtained in the same manner as in Ex. 1 except that the fluororesin (A'-2) was used in place of the fluororesin (A-1).

A laminate (fiber-reinforced molded product) was obtained in the same manner as in Ex. 1 except that the prepreg (a'-2) was used in place of the prepreg (a-1). The adhesion of the laminate is shown in Table 1. Here, this sample was insufficient in adhesion, and therefore, the Izod impact strength was not measured.

TABLE 1

|  |  | Ex. 1 | Ex. 2 |
|---|---|---|---|
| Upper layer matrix resin | Type | (A-1) | (A'-2) |
|  | mass % | 100 | 100 |
|  | Type | — | — |
|  | mass % | — | — |
| Interlayer matrix resin | Type | (B-1) | (B-1) |
|  | mass % | 100 | 100 |
|  | Type | — | — |
|  | mass % | — | — |
| Lower layer matrix resin | Type | (A-1) | (A'-2) |
|  | mass % | 100 | 100 |
|  | Type | — | — |
|  | mass % | — | — |
| Izod impact strength (notched) [J/m] |  | 575 | — |
| Adhesion |  | ○ | × |

In Ex. 1 wherein the upper and lower layer matrix resins contained a fluororesin (A) having functional groups (f) were excellent in adhesion between the respective layers as compared with in Ex. 2 wherein the upper and lower layer matrix resins contained a fluororesin having no functional groups (f).

(Ex. 3)

The fluorinated resin (A-1) was pulverized by the refrigerating pulverizer TPH-01 manufactured by AS ONE Corporation, to obtain a powder having an average particle diameter of 57 µm.

On the other hand, a carbon cloth (manufactured by Sunlight Inc., plain weave CF3000, thickness: 0.25 mm) was cut in a size of the vertical 10 cm×horizontal 10 cm. On the surface of such a carbon cloth, the above powder of the fluororesin (A-1) was uniformly applied by electrostatic coating so that the carbon fiber content would be Vf=50%. Thereafter, in a hot air circulating drying machine, heat exposure at 260° C. for 3 minutes, was conducted to obtain a prepreg (a-1P) having the powder of the fluororesin (A-1) impregnated.

Here, Vf was calculated by the following formula.

Vf (%)=(volume of carbon cloth/(volume of carbon cloth+volume of coated powder (Z)))×100

10 sheets of the obtained prepreg were stacked to obtain a stacked product. The stacked product was press-molded by using a melt heat pressing machine (manufactured by Tester Sangyo Co., Ltd.) under conditions of temperature: 280° C., pressure: 10 MPa, pressing time: 15 minutes (preheating process: 12 min. (without pressurization), compression process: 3 min.) to obtain a laminate (fiber-cured molded product) having a thickness of 2.3 mm (±0.05). The Izod impact strength and adhesion of the obtained laminate are shown in Table 2.

(Ex. 4)

The thermoplastic resin (B-1) was pulverized by the refrigerating pulverizer TPH-01 manufactured by AS ONE Corporation, to obtain a powder having an average particle diameter of 122 µm. A prepreg (b-1P) having a powder of the thermoplastic resin (B-1) impregnated, was obtained in the same manner as in Ex. 3 except that by using a powder of the above thermoplastic resin (B-1) in place of the powder of the fluororesin (A-1), heat exposure at 240° C. for 3 minutes was conducted in a hot air circulating dryer.

The obtained prepreg (b-1P) and the prepreg (a-1P) described in Ex. 3 were alternately stacked in a total of 10 sheets to obtain a stacked product. The stacked product was subjected to press-molding in the same manner as in Ex. 3 to obtain a laminate (fiber-cured molded product) having a thickness of 2.3 mm (±0.05). The Izod impact strength and adhesion of the obtained laminate are shown in Table 2.

TABLE 2

|  | Ex. 3 | Ex. 4 |
|---|---|---|
| Construction | (A-1)/(A-1) | (A-1)/(B-1) |
| Izod impact strength [J/m] | 691 | 626 |
| Adhesion | ○ | ○ |

INDUSTRIAL APPLICABILITY

The fiber-reinforced molded product of the present invention is useful as a member to constitute transport equipment (vehicles (automobiles, railway vehicles, etc.), aircrafts, etc.), construction, electrical and electronic equipment, etc.

This application is a continuation of PCT Application No. PCT/JP2017/000864, filed on Jan. 12, 2017, which is based upon and claims the benefit of priority from Japanese Patent Application No. 2016-004492 filed on Jan. 13, 2016. The contents of those applications are incorporated herein by reference in their entireties.

What is claimed is:

1. A prepreg, comprising reinforcing fibers and a matrix resin, wherein:
the matrix resin comprises, as a resin component, only a melt-moldable fluororesin having a melting point of at least 100° C. and at most 325° C. and having functional groups of at least one member selected from the group consisting of carbonyl group-comprising groups, hydroxy groups, epoxy groups and isocyanate groups, or the fluororesin and a thermoplastic resin other than the fluororesin, and in 100 mass % of the total of the fluororesin and the thermoplastic resin, a proportion of the fluororesin is from 70 to 100 mass % and a proportion of the thermoplastic resin is from 0 to 30 mass %; and
the prepreg is a reinforcing fiber sheet impregnated with the matrix resin.

2. The prepreg of claim 1, wherein:
in 100 mass % of the total of the fluororesin and the thermoplastic resin, the proportion of the fluororesin is from 70 to less than 100 mass %, and the proportion of the thermoplastic resin is from more than 0 to 30 mass %; and
the matrix resin has a sea-island structure composed of a sea portion comprising the fluororesin and island portions comprising the thermoplastic resin, wherein an average diameter of the island portions is from 0.01 to 200 μm.

3. The prepreg of claim 1, wherein the melting point of the fluororesin is from 100 to less than 260° C.

4. A fiber-reinforced molded product, comprising the prepreg of claim 1.

5. A method for producing a prepreg, the method comprising melting a powder mixture obtained by mixing a powder (X) made of a resin material ($\alpha$) and a powder (Y) made of a resin material ($\beta$), in the presence of a reinforcing fiber sheet, to impregnate the reinforcing fiber sheet with the resin material ($\alpha$) and the resin material ($\beta$),
wherein the resin material ($\alpha$) comprises a melt-moldable fluororesin having a melting point of from 100 to 325° C. and having functional groups of at least one member selected from the group consisting of carbonyl group-comprising groups, hydroxy groups, epoxy groups and isocyanate groups, and the resin material (0) comprises a thermoplastic resin other than the fluororesin, so that in 100 mass % of the total of the fluororesin and the thermoplastic resin, a proportion of the fluororesin becomes from 70 to less than 100 mass %, and a proportion of the thermoplastic resin becomes from more than 0 to 30 mass %.

6. The method of claim 5, wherein an average particle diameter of the powder (X) is from 0.02 to 200 μm, and an average particle diameter of the powder (Y) is from 0.02 to 200 μm.

7. A method for producing a prepreg, the method comprising melting a powder (Z) made of a resin material ($\gamma$), in the presence of a reinforcing fiber sheet, to impregnate the reinforcing fiber sheet with the resin material ($\gamma$),
wherein the resin material ($\gamma$) comprises, as a resin component, only a melt-moldable fluororesin having a melting point of from 100 to 325° C. and having functional groups of at least one member selected from the group consisting of carbonyl group-comprising groups, hydroxy groups, epoxy groups and isocyanate groups, or the fluororesin and a thermoplastic resin other than the fluororesin, so that in 100 mass % of the total of the fluororesin and the thermoplastic resin, a proportion of the fluororesin is from 70 to 100 mass %, and a proportion of the thermoplastic resin is from 0 to 30 mass %.

8. The method of claim 7, wherein:
an average particle diameter of the powder (Z) is from 0.02 to 200 μm;
in 100 mass % of the total of the fluororesin and the thermoplastic resin, the proportion of the fluororesin is from 70 to less than 100 mass %, and the proportion of the thermoplastic resin is from more than 0 to 30 mass %; and
an average diameter of island portions comprising the thermoplastic resin in the resin material ($\gamma$) prior to being impregnated into the reinforcing fiber sheet is from 0.01 to 8 μm and less than the average particle diameter of the powder (Z).

9. A method for producing a prepreg, the method comprising melting a resin film made of a resin material ($\gamma$), in the presence of a reinforcing fiber sheet, to impregnate the reinforcing fiber sheet with the resin material ($\gamma$),
wherein the resin material ($\gamma$) comprises, as a resin component, only a melt-moldable fluororesin having a melting point of from 100 to 325° C. and having functional groups of at least one member selected from the group consisting of carbonyl group-comprising groups, hydroxy groups, epoxy groups and isocyanate groups, or the fluororesin and a thermoplastic resin other than the fluororesin, so that in 100 mass % of the total of the fluororesin and the thermoplastic resin, a proportion of the fluororesin is from 70 to 100 mass %, and a proportion of the thermoplastic resin is from 0 to 30 mass %.

10. The method of claim 9, wherein:
in 100 mass % of the total of the fluororesin and the thermoplastic resin, the proportion of the fluororesin is from 70 to less than 100 mass %, and the proportion of the thermoplastic resin is from more than 0 to 30 mass %; and
an average diameter of island portions comprising the thermoplastic resin in the resin material ($\gamma$) prior to being impregnated into the reinforcing fiber sheet is from 0.01 to 8 μm and less than a thickness of the resin film.

* * * * *